United States Patent
Xue et al.

(10) Patent No.: US 12,286,528 B2
(45) Date of Patent: Apr. 29, 2025

(54) AQUEOUS POLYMER FORMULATION

(71) Applicants: Dow Global Technologies LLC, Midland, MI (US); Rohm and Haas Company, Collegeville, PA (US)

(72) Inventors: Yin Xue, Shanghai (CN); Thierry Egraz, Valbonne (FR)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 644 days.

(21) Appl. No.: 17/597,414

(22) PCT Filed: Jul. 12, 2019

(86) PCT No.: PCT/CN2019/095739
§ 371 (c)(1),
(2) Date: Jan. 5, 2022

(87) PCT Pub. No.: WO2021/007692
PCT Pub. Date: Jan. 21, 2021

(65) Prior Publication Data
US 2022/0282081 A1 Sep. 8, 2022

(51) Int. Cl.
*C08L 33/06* (2006.01)
*C09J 133/06* (2006.01)

(52) U.S. Cl.
CPC ......... *C08L 33/066* (2013.01); *C09J 133/066* (2013.01)

(58) Field of Classification Search
CPC ...... C08L 33/066; C08L 51/003; C08L 51/06; C09J 133/066; C08F 220/1804; C08F 212/08; C08F 220/06; C08F 220/20; C08F 222/02; C08F 220/283; C08F 265/04
See application file for complete search history.

(56) References Cited

U.S. PATENT DOCUMENTS

| | | |
|---|---|---|
| 6,262,159 B1 | 7/2001 | Dreher et al. |
| 6,403,706 B1 * | 6/2002 | Wang ................ C08F 279/02 525/61 |
| 7,737,208 B2 | 6/2010 | Kashihara |
| 7,964,116 B2 | 6/2011 | Katsuta et al. |
| 8,173,744 B2 | 5/2012 | Ishikura et al. |
| 11,286,381 B2 | 3/2022 | Xue et al. |
| 2008/0287594 A1 * | 11/2008 | Kashihara ............ C09D 123/26 524/502 |
| 2009/0163635 A1 * | 6/2009 | Raynolds ............ C09D 151/06 524/529 |
| 2013/0202885 A1 | 8/2013 | Dodge et al. |
| 2014/0137435 A1 | 5/2014 | Yano |
| 2015/0147502 A1 | 5/2015 | Lindenmuth et al. |
| 2015/0218426 A1 | 8/2015 | Clay et al. |
| 2016/0177144 A1 | 6/2016 | Cagan |
| 2017/0073484 A1 * | 3/2017 | Pineau ................ D06M 15/59 |
| 2019/0218433 A1 | 7/2019 | Lee et al. |
| 2021/0277217 A1 | 9/2021 | Xue et al. |

FOREIGN PATENT DOCUMENTS

| | | |
|---|---|---|
| CN | 101250368 | 5/2013 |
| EP | 03486295 A1 | 5/2019 |
| JP | 2005146202 | 6/2005 |
| JP | 2006036920 A | 2/2006 |
| JP | 2007-291282 A | 11/2007 |
| JP | 2011508006 A | 3/2011 |
| JP | 2011174056 A | 9/2011 |
| JP | 2015511260 A | 4/2015 |
| JP | 2015117382 A | 6/2015 |

OTHER PUBLICATIONS

PCT/CN2019/095739, International Search Report and Written Opinion with a mailing date of Mar. 17, 2020.
PCT/CN2019/095739, International Preliminary Report on Patentability with a mailing date of Jan. 18, 2022.
Tselios C et al "Glass Fiber Reinforcement of In Situ Compatibilized Polypropylene/Polyethylene Blends" Journal of Materials Science, Kluwer Academic Publishers, vol. 34, No. 2, Jan. 15, 1999, pp. 385-394.

* cited by examiner

*Primary Examiner* — Doris L Lee
(74) *Attorney, Agent, or Firm* — Boyle Fredrickson, S.C.

(57) ABSTRACT

Provided is a composition comprising an aqueous medium, and further comprising, dispersed in the aqueous medium: (a) particles (a) that comprise a maleated polyolefin (a), and (b) particles (b) that comprise an acrylic polymer (b), wherein the acrylic polymer (b) comprises, by weight based on the solid weight of the acrylic polymer (b): (i) 0.1% to 10% polymerized units of hydroxyl functional acrylic monomer, (ii) 1% to 20% polymerized units of carboxyl functional monomer, and (iii) 70% to 98.9% polymerized units of one or more additional monomer (iii) selected from the group consisting of acrylic monomers, styrenic monomers, and mixtures thereof, wherein the maleated polyolefin (a) is present in an amount of 1% to 19% by weight based on the sum of the solid weights of maleated polyolefin (a) and acrylic polymer (b). Also provided is a method of binding fibers using the composition.

11 Claims, No Drawings

AQUEOUS POLYMER FORMULATION

Polymers that act to bind fibers together are useful in the textile industry. Such polymers, often called "binders," may be applied to fibers either in the form of a non-woven mat or in the form of threads that have been woven to form a textile. The presence of such polymers can act to improve the tensile strength of the nonwoven or woven fabric, especially when the fabric is impregnated with a liquid, either with water (i.e., "wet strength") or with solvent (i.e, "solvent strength").

A convenient way of applying binder polymer to fibers is to provide the polymer in the form of small particles dispersed in water. The particles may be all the same composition as each other, or particles of different compositions may be present. Such aqueous dispersions have various advantages over comparable polymers dissolved in nonaqueous solvents; the aqueous dispersions generally have lower viscosity and are more environmentally friendly.

The aqueous dispersion (which may be an emulsion, a latex, a slurry, another form of dispersion, or a combination thereof) may be applied to the fibers, and then the water may be removed by evaporation. It is often desirable that the polymer undergoes a crosslinking reaction during or after the evaporation process. It is considered that such crosslinking reactions increase the tensile strength of the final fabric. In the past, some polymer binders contained polymerized units of N-methylolacrylamide (NMA), which promoted desirable crosslinking, but such polymers released formaldehyde upon heating, which is not desirable.

U.S. Pat. No. 8,173,744 describes a water-based primer composition that contains two acid- or anhydride-modified polyolefins and may further contain one or more acrylic polymer, where the solid weight ratio of modified polyolefins to acrylic polymer is from 20/80 to 80/20. WO2018176298 discloses a curable composition comprising 70 to 99% by dry weight an acrylic emulsion component, and from 1 to 30% by dry weight, a polyolefin emulsion component prepared by emulsifying a polycarboxylic-compound functionalized polyolefin starting material. WO2018176298 discloses that the curable composition may be used for treating a flexible substrate such as, leather; woven or nonwoven fabrics; felts and mats or other assemblies of fibers; and fibers. It is desired to provide a new polymer binder that has one or more of the following benefits: free of polymerized units of NMA; improves wet strength; improves solvent strength; is provided in the form of an aqueous dispersion.

The following is a statement of the invention.

A first aspect of the present invention is a composition comprising an aqueous medium, and further comprising, dispersed in the aqueous medium:
(a) particles (a) that comprise a maleated polyolefin (a), and
(b) particles (b) that comprise an acrylic polymer (b), wherein the acrylic polymer
  (b) comprises, by weight based on the solid weight of the acrylic polymer (b):
  (i) 0.1% to 10% polymerized units of hydroxyl functional acrylic monomer,
  (ii) 1% to 20% polymerized units of carboxyl functional monomer, and
  (iii) 70% to 98.9% polymerized units of one or more additional monomer (iii) selected from the group consisting of acrylic monomers, styrenic monomers, and mixtures thereof, wherein the maleated polyolefin (a) is present in an amount of 1% to 19% by weight based on the sum of the solid weights of maleated polyolefin (a) and acrylic polymer (b).

A second aspect of the present invention is a method of binding fibers comprising bringing an aqueous binder composition into contact with the fibers, and then causing or allowing water to evaporate from the aqueous binder composition, wherein the aqueous binder composition is the composition of claim 1.

The following is a detailed description of the invention.

As used herein, the following terms have the designated definitions, unless the context clearly indicates otherwise.

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. A polymer has number-average molecular weight of 1,000 or higher.

As used herein "weight of polymer" means the dry weight of polymer.

Molecules that can react with each other to form the repeat units of a polymer are known herein as "monomers." The repeat units so formed are known herein as "polymerized units" of the monomer.

As used herein, acrylic monomers are monomers selected from (meth)acrylic acid, alkyl esters of (meth)acrylic acid, alkyl esters of (meth)acrylic acid having one or more substituent on the alkyl group, (meth)acrylamide, N-substituted (meth)acrylamide, and mixtures thereof. The prefix "(meth)acryl-" means "acryl- or methacryl-.

As used herein, styrenic monomers are monomers selected from styrene, substituted styrenes, and mixtures thereof. Substituted styrenes have one or more substituents, located either on the aromatic ring or on the vinyl group or a combination thereof.

A hydroxyl functional monomer is a monomer that has one or more pendant OH group that is not part of a carboxyl group. A carboxyl functional monomer is a monomer that has a pendant carboxyl group; the carboxyl group may be in neutral form or in anion form.

As used herein, a hydroxyalkyl (meth)acrylamide is a derivative of acrylamide or methacrylamide in which an alkyl group is attached to the nitrogen atom of the (meth)acrylamide structure, and a hydroxyl group is attached to that alkyl group.

As used herein, an "acrylic" polymer is a polymer in which 50% or more of the polymerized units are selected from acrylic monomers and also in which 75% or more of the polymerized units are selected from the group consisting of acrylic monomers and styrenic monomers. The percentages are by weight based on the weight of the polymer.

As used herein, a polyolefin is a polymer in which 70% or more of the polymerized monomer units are selected from hydrocarbon alkenes, hydrocarbon dienes, and mixtures thereof, by weight based on the weight of the polymer. A maleated polyolefin is a polyolefin that has been reacted with maleic anhydride in order to covalently attach carboxyl and/or anhydride groups to the polyolefin.

An aqueous medium is a composition that is liquid over a temperature range that includes the range of 5° C. to 50° C. The aqueous medium comprises water in the amount of 50% or more by weight based on the weight of the aqueous medium. The aqueous medium includes substances that are dissolved as individual molecules, atoms, or ions. The aqueous medium does not include substances that are present as discreet solid particles or liquid droplets such as, for example, emulsion droplets, latex particles, dispersed solid particles, other forms of dispersed particles, and combinations thereof.

The glass transition temperature (Tg) of a polymer is measured by dynamic scanning calorimetry by the midpoint method, scanned at 10° C./min. The Tg of a monomer is defined herein as the Tg of a homopolymer made from that monomer.

The term "fiber" refers to material that has a certain geometric shape, regardless of the composition of the material. The longest dimension of a fiber is at least 100 times longer than any dimension perpendicular to the longest dimension.

Ratios presented herein are characterized as follows. For example, if a ratio is said to be 3:1 or greater, that ratio may be 3:1 or 5:1 or 100:1 but may not be 2:1. This characterization may be stated in general terms as follows. When a ratio is said herein to be X:1 or greater, it is meant that the ratio is Y:1, where Y is greater than or equal to X. For another example, if a ratio is said to be 15:1 or less, that ratio may be 15:1 or 10:1 or 0.1:1 but may not be 20:1. In general terms, when a ratio is said herein to be W:1 or less, it is meant that the ratio is Z:1, where Z is less than or equal to W. Ratios are by weight unless otherwise stated.

The composition of the present invention contains an aqueous medium. Preferably the aqueous medium contains water in the amount, by weight based on the weight of the aqueous medium, of 50% or more; more preferably 75% or more; more preferably 85% or more; more preferably 90% or more.

Dispersed in the aqueous medium are particles (a) that comprise one or more maleated polyolefin (a). Preferably, most or all of the mass of particles (a) is maleated polyolefin. That is, preferably the amount of maleated polyolefin in particles (a), by weight based on the weight of particles (a), is 50% or more; more preferably 75% or more; more preferably 85% or more; more preferably 95% or more.

It is useful to characterize a maleated polyolefin by the composition of the polymer backbone, which is the composition polymer would have if the attached maleic anhydride groups were ignored. The backbone composition is considered to be the same as the composition that the polyolefin had prior to reaction with maleic anhydride. In preferred polyolefin polymer backbones, the amount of polymerized units of propylene is, by weight based on the weight of the polyolefin polymer backbone, 50% or more; more preferably 75% or more; more preferably 85% or more; more preferably 95% or more.

Maleated polyolefin may be characterized by the acid number. Preferably, the acid number of the maleated polyolefin (a) is 35 mg KOH/g or higher; more preferably 45 mg KOH/g or higher; more preferably 55 mg KOH/g or higher. Preferably, the acid number of the maleated polyolefin (a) is 90 mg KOH/g or lower; more preferably 80 mg KOH/g or lower; more preferably 70 mg KOH/g or lower.

Dispersed in the aqueous medium are particles (b) that comprise one or more acrylic polymer (b). Preferably, most or all of the mass of particles (b) is acrylic polymer. That is, preferably the amount of acrylic polymer in particles (b), by weight based on the weight of particles (b), is 50% or more; more preferably 75% or more; more preferably 85% or more; more preferably 95% or more.

Acrylic polymer (b) comprises polymerized units of hydroxyl functional acrylic monomer. Preferred hydroxyl functional acrylic monomers are hydroxyalkyl (meth)acrylates, caprolactone-modified (meth)acrylates, and mixtures thereof. Caprolactone-modified (meth)acrylates have the structure (I):

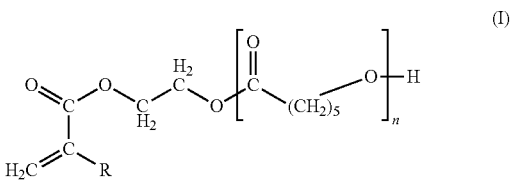

where R is hydrogen or methyl, and n is an integer from 1 to 10. Among hydroxyalkyl (meth)acrylates, preferred alkyl groups are ethyl and propyl. Preferred hydroxyalkyl (meth)acrylates are hydroxyethyl acrylate and hydroxyethyl methacrylate. Preferred caprolactone-modified (meth)acrylates have R that is hydrogen. Preferred caprolactone-modified (meth)acrylates have n of 5 or less; more preferably 4 or less; more preferably 3 or less.

Preferably, the amount of polymerized units of hydroxyl functional acrylic monomer in acrylic polymer (b) is, by weight based on the weight of acrylic polymer (b), 0.1% or more; more preferably 0.2% or more; more preferably 0.5% or more; more preferably 0.9% or more. Preferably, the amount of polymerized units of hydroxyl functional acrylic monomer in acrylic polymer (b) is, by weight based on the weight of acrylic polymer (b), 10% or less; more preferably 7% or less; more preferably 5% or less; more preferably 3% or less.

Acrylic polymer (b) also comprises polymerized units of carboxyl functional monomer. Preferred carboxyl functional monomers are acrylic monomers; more preferred are (meth)acrylic acid, itaconic acid, and mixtures thereof. Between acrylic acid and methacrylic acid, acrylic acid is preferred.

Preferably, the amount of polymerized units of carboxyl functional monomer in acrylic polymer (b) is, by weight based on the weight of acrylic polymer (b), 1% or more; more preferably 1.5% or more; more preferably 2% or more. Preferably, the amount of polymerized units of carboxyl functional monomer in acrylic polymer (b) is, by weight based on the weight of acrylic polymer (b), 20% or less; more preferably 15% or less; more preferably 10% or less; more preferably 7% or less.

Acrylic polymer (b) also contains polymerized units of additional monomer, herein labeled monomer (iii), that is neither hydroxyl functional acrylic monomer nor carboxyl functional monomer. The additional monomer (iii) is selected from acrylic monomers, styrenic monomers, and mixtures thereof.

Preferably, monomer (iii) contains one or more acrylic monomers that have Tg of 20° C. or below; more preferably 0° C. or below; more preferably −20° C. or below; more preferably −40° C. or below. Preferably, monomer (iii) contains one or more acrylic monomers that have Tg of −100° C. or higher; more preferably −80° C. or higher. Preferably, monomer (iii) contains one or more unsubstituted alkyl esters of (meth)acrylic acid; more preferably one or more unsubstituted alkyl esters of acrylic acid. Among unsubstituted alkyl esters of (meth)acrylic acid, preferred are those in which the alkyl group has 2 or more carbon atoms; more preferably 3 or more carbon atoms. Among unsubstituted alkyl esters of (meth)acrylic acid, preferred are those in which the alkyl group has 12 or fewer carbon atoms; more preferably 8 or fewer carbon atoms.

Within the polymerized units of monomer (iii), preferably the amount of polymerized units of acrylic monomer is, by weight based on the weight of polymer (b), 50% or more; more preferably 60% or more; more preferably 70% or more. Within the polymerized units of monomer (iii), preferably the amount of polymerized units of acrylic monomer is, by weight based on the weight of polymer (b), 95% or less; more preferably 90% or less.

Preferably, monomer (iii) also contains one or more styrenic monomers. Preferred styrenic monomers are styrene, alpha-alkyl styrenes, other substituted styrenes, and mixtures thereof; more preferred is styrene. Within polymerized units of monomer (iii), preferably the amount of polymerized units of styrenic monomers is 2% or more; more preferably 5% or more; more preferably 10% or more. Within polymerized units of monomer (iii), preferably the amount of polymerized units of styrenic monomers is 50% or less; more preferably 40% or less; more preferably 25% or less; more preferably 15% or less.

Preferably the amount of polymerized units of hydroxyalkyl (meth)acrylamide monomer in polymer (b) is little or none. That is, preferably, the amount of polymerized units of hydroxyalkyl (meth)acrylamide monomer in polymer (b) is, in weight percent based on the weight of the acrylic polymer (b), 0 to 0.2%; more preferably 0 to 0.1%; more preferably 0 to 0.05%; more preferably zero.

Preferably the acrylic polymer (b) has Tg of 150° C. or lower; more preferably 100° C. or lower; more preferably 50° C. or lower; more preferably 25° C. or lower; more preferably 0° C. or lower. Preferably the acrylic polymer (b) has Tg of −100° C. or higher; more preferably −50° C. or higher.

Polymer (b) is in the form of particles dispersed in an aqueous medium. Polymer (b) may be made and put into dispersed form by any method. A preferred method of making polymer (b) and putting it into dispersed form is aqueous emulsion polymerization, which is described as follows. In aqueous emulsion polymerization, one or more monomer emulsions is made of liquid droplets of one or more monomer dispersed in an aqueous medium. These one or more emulsions are exposed to a polymerization initiator, which is a compound that can react to form one or more free-radical moieties that can initiate free-radical polymerization of monomer. Monomer emulsion may be exposed to initiator by any method, including, for example, batch polymerization methods and continuous-addition polymerization methods. Preferably the initiator is water-soluble (i.e., 2 grams or more may be dissolved in water at 25° C.). New particles form, in which polymer (b) grows by free-radical polymerization. When the process is complete, the particles are known as latex particles, and the composition of polymer (b) particles dispersed in an aqueous medium is known as a latex.

Aqueous emulsion polymerization may be conducted as a single-stage process or as a multi-stage process. In a single-stage process, one or more monomer emulsions is polymerized as described above, and the resulting latex is put to use. In a two-stage process, once a single monomer emulsion (or a single mixture of monomer emulsions) has reached completion of a polymerization process (i.e., at the end of the first stage), a new monomer emulsion (or mixture of monomer emulsions) is exposed to initiator in the presence of the polymer formed in the first stage, and the completion of the resulting polymerization is the end of the second stage. Similarly, additional stages may be performed. A multi-stage polymer is formed by a process having two or more stages.

Maleated polyolefin (a) and acrylic polymer (b) may be brought together by any method. In a preferred method, an aqueous dispersion of particles of maleated polyolefin (a) is provided; a latex of polymer (b) is separately made by aqueous emulsion polymerization; and the two dispersions are mixed.

Preferably, the total weight of all solid polymers in the composition, as a percentage of the total weight of the composition, is 10% or more; more preferably 20% or more; more preferably 30% or more. Preferably, the total weight of all solid polymers in the composition, as a percentage of the total weight of the composition, is 50% or less.

The relative amounts of maleated polyolefin (a) and acrylic polymer (b) may be characterized by the quantity "PCTa," defined as the solid weight of maleated polyolefin (a), as a percentage of the total solid weights of maleated polyolefin (a) and acrylic polymer (b). Preferably PCTa is 1% or more; more preferably 2% or more; more preferably 5% or more; more preferably 7% or more. Preferably PCTa is 19% or less; more preferably 16% or less; more preferably 13% or less; more preferably 10% or less.

The composition of the present invention may be used for any purpose. A preferred use is as a binder for nonwoven fabrics. For example, a collection of individual fibers (i.e., fibers that have not been spun into thread) may be brought into contact with the composition of the present invention, for example by dipping, metering, spraying, or other methods; the water in the composition of the present invention is evaporated or allowed to evaporate, to create a nonwoven mat. The resulting nonwoven mat may or may not be heated (i.e., exposed to temperature above 40° C.), either before or during evaporation of the water. It is contemplated that a continuous volume of polymer will adhere to more than one fiber, and so the polymer will act to bind fibers together.

One measure of the effectiveness of a polymer binder is the tensile strength of the nonwoven mat, especially when the mat has been exposed to water or organic solvent. Higher tensile strength is desirable.

Fibers that are bound together by the composition of the present invention may be made of any material. Fibers may be mineral fibers or organic fibers. Organic fibers may be natural or artificial. Some suitable natural organic fibers are made of, for example, cellulose, a cellulose derivative, cotton, linen, and wool. Some suitable artificial organic fibers are made of, for example, rayon, nylon, polyester, acrylic polymer, and polyolefin. In the practice of the present invention, fibers may be mixtures of suitable fibers.

The following are examples of the present invention. Operations were performed at room temperature (approximately 23° C.) except where otherwise stated.

Abbreviations used herein are as follows:
DI=deionized
SBS=sodium bisulfite
APS=ammonium persulfate
t-BHP=t-butyl hydroperoxide
FF6=BRUGGELITE™ reducing agent from Bruggemann Chemical
DS-4=sodium dodecylbenzene sulfonate, from Solvay
BA=n-butyl acrylate
Sty=styrene
IA=itaconic acid
AA=acrylic acid
HEMA=hydroxyethyl methacrylate
HEA=hydroxyethyl acrylate FA2D=caprolactone-modified acrylic monomer (structure (I) above, where R is hydrogen and n is 2.
AC-597P=maleic anhydride modified polypropylene dispersion (39% solid polymer by weight; acid value 63 mg KOH/g, supplied by Honeywell.
TRITON™ X-100=surfactant from Dow Chemical Company
IPA=isopropanol
Paper=WHATMAN™ #4 paper from Whatman Ltd.

EXAMPLE 1

Synthesis of Acrylic Polymer Latex

A one-stage Acrylic latex (denoted as latex B-1) including 81% BA, 13% Sty, 2.5% AA, 2.5% IA, 1% HEMA by weight based on the dry weight of the copolymer, was prepared according to below process.

Preparation of Monomer Emulsion B-1: 5.77 g DS-4 was dissolved in 475 g deionized water (DI water). An emulsified monomer mixture was prepared by adding the following chemicals slowly to the agitated solution: 6.84 g IA, 13.7 g HEMA, 34.2 g AA, 1107.4 g BA, 177.7 g Sty.

A solution containing 50.42 g DS4 and 370 g DI water were placed in a 5-necked, 5 liter round bottom flask equipped with a thermocouple, a cooling condenser and an agitator, and heated to 70° C. under nitrogen. Charged 27.4 g Itaconic Acid (IA) in 255 g 60° C. DI water into the Kettle. Then Charged 82.8 g Monomer Emulsion into the Kettle. Then Charged 3.72 g APS in 25 g DI water, and 1.86 g sodium bisulfite (SBS) in 20 g DI water into the Kettle. When the exotherm peak occurred and temperature was at 70° C., fed rest of Monomer Emulsion, a solution of APS [2.48 g in 50 g DI water] and a solution of SBS (1.24 g in 50 g DI water) in 120 minutes. The polymerization reaction temperature was maintained at 69 to 71° C. After completing the addition, the vessel that contained the Monomer Emulsion and the feeding pipes leading into the flask were rinsed with 90 g DI water, and the rinse was added back to the flask. Then held at 70° C. for 15 minutes. After holding, charged solution of t-BHP (70%, 1.05 g in 5 g DI Water) and FF6 (0.9 g) in 5 g DI Water. Held for 15 minutes, then gradual addition of solution of t-BHP (70%, 3.98 g in 38 g DI Water) and FF6 (3.38 g in 42 g DI Water) over 60 minutes. The reaction was cooled to room temperature (approximately 23° C.). Added 15 g Ammonia solution to adjust pH value to 6.5~7.5. The solid content was 45%.

Latex B-2 was prepared according the same process with B-1, except the recipe of monomer emulsion: 5.77 g DS-4 was dissolved in 475 g deionized water (DI water). An emulsified monomer mixture was prepared by adding the following chemicals slowly to the agitated solution: 6.84 g IA, 13.7 g FA2D, 34.2 g Glacial Acrylic Acid, 1093.8 g Butyl Acrylate, 177.7 g Styrene.

Latex B-3 was prepared according the same process with SWX1307, except the recipe of monomer emulsion: 5.77 g DS-4 was dissolved in 475 g deionized water (DI water). An emulsified monomer mixture was prepared by adding the following chemicals slowly to the agitated solution: 6.84 g IA, 34.2 g HEA, 1107.4 g Butyl Acrylate, 191.4 g Styrene.

Latex B-4 was prepared according the same process with SWX1307, except the recipe of monomer emulsion: 5.77 g DS-4 was dissolved in 475 g deionized water (DI water). An emulsified monomer mixture was prepared by adding the following chemicals slowly to the agitated solution: 6.84 g IA, 34.2 g FA2D, 1107.4 g Butyl Acrylate, 191.4 g Styrene.

Comparative Latex C-1 was prepared according the same process with B-1, except the recipe of monomer emulsion: 5.77 g DS-4 was dissolved in 475 g deionized water (DI water). An emulsified monomer mixture was prepared by adding the following chemicals slowly to the agitated solution: 6.84 g IA, 34.2 g Glacial Acrylic Acid, 1093.8 g Butyl Acrylate, 191.4 g Styrene.

Latex B-5: A two-stage Acrylic latex (denoted as latex B-5) including 90% monomer based on total monomers in the first stage with 90% BA, 5.55% Sty, 1.67% AA, 2.78% IA, and 10% monomer based on total monomers in the second stage with 88% Sty, 10% HEMA, 2% AA, was prepared according to below process.

Preparation of Monomer Emulsion—stage I (B-5)—5.77 g DS-4 was dissolved in 475 g deionized water (DI water). An emulsified monomer mixture was prepared by adding the following chemicals slowly to the agitated solution: 6.84 g IA, 20.4 g AA, 1107.4 g BA, 68.4 g Sty.

Preparation of Monomer Mix—stage II (B-5)—120.3 g Sty, 13.7 g HEMA and 2.7 g AA were mixed together.

A solution containing 50.42 g DS4 and 370 g deionized water ("DI water" herein) were placed in a 5-necked, 5 liter round bottom flask equipped with a thermocouple, a cooling condenser and an agitator, and heated to 70° C. under nitrogen. Charged 27.4 g Itaconic Acid (IA) in 255 g 60° C. DI water into the Kettle. Then Charged 82.8 g Monomer Emulsion—stage I into the Kettle. Then Charge 3.72 g Ammonium Persulfate (APS) in 25 g DI water, and 1.86 g sodium bisulfite (SBS) in 20 g DI water into the Kettle. When the exotherm peak occurred and temperature was at 70° C., Fed rest of Monomer Emulsion—stage I, a solution of APS [2.48 g in 50 g DI water] and a solution of SBS (1.24 g in 50 g DI water) in 120 minutes. The polymerization reaction temperature was maintained at 69 to 71° C. After completing the addition, the vessel that contained the Monomer Emulsion and the feeding pipes leading into the flask were rinsed with 90 g DI water, and the rinse was added back to the flask. Then held at 70° C. for 15 minutes.

After holding, charged Monomer Mix-Stage II, and then solution of t-BHP (70%, 1.05 g in 5 g DI Water) and FF6 (0.9 g) in 5 g DI Water. Held for 15 minutes. then gradual addition of solution of t-BHP (70%, 3.98 g in 38 g DI Water) and FF6 (3.38 g in 42 g DI Water) over 60 minutes. The reaction was cooled to room temperature (approximately 23° C.). Added 15 g Ammonia solution to adjust pH value to 6.5~7.5. The solid content was 45%.

Comparative Latex C-2 was prepared according the same process with B-1, except the recipe of monomer mix—stage II: 123 g Sty, 13.7 g AA were mixed together.

The compositions of the above latexes are summarized in the table below. The symbol "//" separates the two stages in a two-stage process. The amounts shown are by weight.

| Latex | Composition |
| --- | --- |
| B-1 | 81BA/13St/2.5AA/2.5IA/1HEMA |
| B-2 | 80BA/14St/2.5AA/2.5IA/1FA2D |
| B-3 | 81BA/14St/2.5HEA/2.5IA |
| B-4 | 81BA/14St/2.5FA2D/2.5IA |
| B-5 | 90 90BA/5.55St/2.78IA/1.67AA//10 88St/10HEMA/2AA |
| Comparative C-1 | 81BA/14St/2.5AA/2.5IA |
| Comparative C-2 | 90 90BA/5.55St/2.78IA/1.67AA//10 90St/10AA |

EXAMPLE 2

Testing of Binder Compositions

Blended binders were made as follows: 11.5 parts by weight of the aqueous dispersion AC-579P were mixed with 100 parts by weight of one of the aqueous latexes described above, with agitation for 15 minutes. In each resulting mixture, the weight percent of solid maleated polyolefin, based on the sum of the solid weights of maleated polyolefin and acrylic polymer, was 9.1%.

Neat acrylic binders were each one of the latexes described above, used as made.

The effectiveness of the binders was tested as follows. A piece of WHATMAN™ paper 28 cm×46 cm was dipped into 300 mL formulated emulsion. The treated substrate was padded by Mathis padder and then dried and cured at 150° C. for 3 minutes. The add-on of the polymer on paper was controlled between 14 and 16% (weight of polymer on weight of paper). The cured substrate was cut into pieces of 2.54 cm (1 inch)×10.16 cm (4 inch) wherein the long direction is the cross-machine (CD) direction of the paper. The tensile strength of specimens was tested under each of the following treatments: dry (untreated), wet (after 30 minutes immersion in 0.1% by weight Triton X-100/water solution) and IPA (after 30 minutes immersion in IsoPropanol) on an Instron™ tensile tester. The wet strength reflects the resistance of binder to water, and the IPA strength reflects the resistance of binder to solvent. It is considered that the effectiveness of a binder to add strength to this paper indicates the effectiveness of the binder to bind fibers together in a variety of situations, including for example, in nonwoven fabrics.

The tensile test results are reported below. The units shown are kilograms of force (kgf), which may be interpreted as kgf per 2.54 cm of width of sample. The heading "ID" refers to the identifying label of each binder; ID labels ending in "C" are comparative samples. Amounts of polymer are denoted by percent of solid weight (wt %).

| ID | AC-597P wt % | acrylic | acrylic wt % | dry tensile (kgf) | wet tensile (kgf) | IPA tensile (kgf) |
|---|---|---|---|---|---|---|
| neat-1C | 0 | B-1 | 100 | 6.72 | 2.82 | 2.28 |
| blend-1 | 9.1 | B-1 | 90.9 | 6.31 | 3.71 | 3.13 |
| neat-2C | 0 | B-2 | 100 | 6.18 | 2.76 | 2.21 |
| blend-2 | 9.1 | B-2 | 90.9 | 6.36 | 3.46 | 3.04 |
| neat-3C | 0 | B-3 | 100 | 5.69 | 2.41 | 2.43 |
| blend-3 | 9.1 | B-3 | 90.9 | 5.97 | 3.47 | 3.32 |
| neat-4C | 0 | B-4 | 100 | 5.3 | 2.05 | 2.37 |
| blend-4 | 9.1 | B-4 | 90.9 | 5.63 | 3.07 | 3.28 |
| neat-5C | 0 | B-5 | 100 | 5.8 | 2.53 | 1.91 |
| blend-5 | 9.1 | B-5 | 90.9 | 6.41 | 3.65 | 2.91 |
| neat-6C | 0 | C-1 | 100 | 6.45 | 2.95 | 1.21 |
| blend-6C | 9.1 | C-1 | 90.9 | 6.22 | 3.16 | 1.75 |
| neat-7C | 0 | C-2 | 100 | 5.98 | 2.79 | 1.73 |
| blend-7C | 9.1 | C-2 | 90.9 | 6.02 | 3.17 | 2.34 |

All of the samples are free of formaldehyde.

One useful set of comparisons is to compare each inventive blend with the corresponding neat binder (for example, comparing blend-1 with comparative neat-1C). Blend-1 has acceptably high dry tensile strength, and so the fact that blend-1 has lower dry tensile than neat-1C is considered inconsequential. Of greater importance is the fact that blend-1 has significantly higher wet tensile strength (32% increase over neat-1C) and IPA tensile strength (37% increase over neat-1C).

When each of blend-2, blend-3, blend-4, and blend-5 is compared, respectively, with neat-2C, neat-3C, neat-4C, and neat-5C, it is shown that dry tensile, wet tensile, and IPA tensile are all higher in the blend sample than in the corresponding comparative neat sample, with increases in tensile strength over the neat samples of 25% to 50%.

These comparisons of the blend examples with the comparative neat examples show that the inventive blended binders, which include both maleated polyolefin and acrylic polymer, have superior performance to acrylic polymer binder alone.

Another useful comparison is comparing blend-6C with neat-6C. Both of these comparative samples lack hydroxyl functional monomer. The blend sample has wet tensile that is somewhat improved over the neat sample. However, this improvement in wet tensile is only 7% over the neat sample, which is a far smaller improvement than seen in the neat vs. blend comparisons among samples that had the hydroxyl functional monomer. This demonstrates that both hydroxyl functional monomer and the blend with maleated polyolefin are needed for excellent performance Comparison of blend-7C with neat-7C shows the same trend and leads to the same conclusion.

It is also useful to compare neat-6C with neat-1C. This comparison shows the effect of the presence (neat-1C) or absence (neat-6C) of hydroxyl functional monomer. Both of these samples have acceptable dry tensile strength. Also, the wet tensile and IPA tensile strengths of these two samples are nearly identical. Thus, when maleated polyolefin is not present, simply including hydroxyl functional monomer in the acrylic polymer does not improve performance. This demonstrates again that both the hydroxyl functional monomer and the presence of maleated polyolefin are needed to achieve excellent performance.

It is also useful to examine the results for neat-5C, blend-5, neat-7C, and blend-7C. Samples neat-7C and blend-7 both used an acrylic polymer with no polymerized units of hydroxyl functional acrylic monomer. Blend-7C has higher wet tensile strength than neat-7C, but the improvement in wet tensile strength is only 14%. That is, the blend of the acrylic with the maleated polyolefin gives higher strength than the acrylic alone, but in the absence of polymerized units of hydroxyl functional acrylic monomer, the improvement due to the use of maleated polyolefin is modest. In contrast, samples neat-5C and blend-5 did have polymerized units of hydroxyl functional acrylic monomer in the acrylic polymer, and in this case, blend-5 showed a larger improvement in wet tensile strength over neat-5C (increase of 44%). That is, the presence of polymerized units of hydroxyl functional acrylic monomer strongly enhances the effect of the presence of the maleated polyolefin.

The invention claimed is:

1. A composition comprising an aqueous medium, and further comprising, dispersed in the aqueous medium:
   (a) particles (a) that comprise a maleated polyolefin (a), and
   (b) particles (b) that comprise an acrylic polymer (b), wherein the acrylic polymer (b) comprises, by weight based on the solid weight of the acrylic polymer (b):
      (i) 0.1% to 10% polymerized units of hydroxyl functional acrylic monomer,
      (ii) 1% to 20% polymerized units of carboxyl functional monomer,
      (iii) 70% to 98.9% polymerized units of one or more additional monomer ii) selected from acrylic monomers, and (iv) 2% to 15% polymerized units of styrenic monomers,
wherein the maleated polyolefin (a) is present in an amount from 7% to 19% by weight based on the sum of the solid weights of maleated polyolefin (a) and acrylic polymer (b).

2. The composition of claim 1, wherein the maleated polyolefin (a) is maleated polypropylene.

3. The composition of claim 1, wherein the additional monomer (iii) comprises one or more acrylic monomers that have Tg of 0° C. or below.

4. The composition of claim 1 wherein the particles (b) consist of
(i) 0.1% to 3% polymerized units of hydroxyl functional acrylic monomer selected from the group consisting of hydroxyethyl methacrylate, hydroxyethyl acrylate, and caprolactone-modified acrylic monomer;
(ii) 1% to 7% polymerized units of carboxyl functional monomer selected from the group consisting of itaconic acid, acrylic acid, and combinations thereof,
(iii) 70% to 90% polymerized units of additional monomer consisting of n-butyl acrylate, and
(iv) 2% to 15% polymerized units of styrene.

5. The composition of claim 4 wherein the maleated polyolefin (a) is present in an amount from 7% to 13% by weight based on the sum of the solid weights of maleated polyolefin (a) and acrylic polymer (b).

6. The composition of claim 5 wherein the (i) 0.1 to 3% polymerized units of hydroxyl functional acrylic monomer consist of hydroxyethyl methacrylate.

7. The composition of claim 5 wherein the (i) 0.1 to 3% polymerized units of hydroxyl functional acrylic monomer consist of hydroxyethyl acrylate.

8. The composition of claim 5 wherein the (i) 0.1 to 3% polymerized units of hydroxyl functional acrylic monomer consist of caprolactone-modified acrylic monomer.

9. The composition of claim 5 wherein the (il) 1 to 7% polymerized units of carboxyl functional monomer consist of itaconic acid and acrylic acid.

10. The composition of claim 5 wherein the (il) 1 to 7% polymerized units of carboxyl functional monomer consist of itaconic acid.

11. A method of binding fibers comprising bringing an aqueous binder composition into contact with the fibers, and then causing or allowing water to evaporate from the aqueous binder composition, wherein the aqueous binder composition is the composition of claim 1.

* * * * *